US008709556B2

(12) United States Patent  (10) Patent No.: US 8,709,556 B2
Ansari et al.  (45) Date of Patent: Apr. 29, 2014

(54) HEAT TRANSFER LABEL FOR DECORATING A METAL CONTAINER

(75) Inventors: Saifuddin M. Ansari, West Chester, OH (US); Ignatius S. Yee, Cincinnati, OH (US); Douglas L. Barnhardt, West Chester, OH (US); Robert J. Wojewoda, Amelia, OH (US)

(73) Assignee: MCC-Norwood, LLC, Batavia, OH (US)

( * ) Notice: Subject to any disclaimer, the term of this patent is extended or adjusted under 35 U.S.C. 154(b) by 156 days.

(21) Appl. No.: 13/276,413

(22) Filed: Oct. 19, 2011

(65) Prior Publication Data

US 2012/0100317 A1  Apr. 26, 2012

Related U.S. Application Data

(60) Provisional application No. 61/394,843, filed on Oct. 20, 2010.

(51) Int. Cl.
*B41M 5/40* (2006.01)
*B41M 5/44* (2006.01)
*B41M 5/42* (2006.01)
*B41M 5/395* (2006.01)
*B41M 5/392* (2006.01)

(52) U.S. Cl.
CPC . *B41M 5/44* (2013.01); *B41M 5/42* (2013.01); *B41M 5/423* (2013.01); *B41M 5/395* (2013.01); *B41M 5/392* (2013.01)
USPC ............ 428/32.77; 428/32.79; 428/32.82; 428/32.86; 428/32.87

(58) Field of Classification Search
CPC .......... B41M 5/44; B41M 5/42; B41M 5/423; B41M 5/395; B41M 5/392
USPC ........... 428/32.77, 32.79, 32.82, 32.86, 32.87
See application file for complete search history.

(56) References Cited

U.S. PATENT DOCUMENTS

| 5,972,481 | A  | 10/1999 | Stein et al. |
| 6,120,883 | A  | 9/2000  | Litman et al. |
| 7,807,262 | B2 | 10/2010 | Ansari et al. |
| 2003/0134110 | A1 | 7/2003 | Laprade |
| 2010/0173136 | A1 | 7/2010 | Ansari et al. |

FOREIGN PATENT DOCUMENTS

| WO | WO 2008/042624 A2 | 4/2008 |
| WO | WO 2010/048368 A2 | 4/2010 |
| WO | WO 2010/083116 A2 | 7/2010 |

OTHER PUBLICATIONS

International Search Report and Written Opinion for PCT/US2011/056802 mailed May 3, 2012.

*Primary Examiner* — Betelhem Shewareged
(74) *Attorney, Agent, or Firm* — Wood, Herron & Evans, LLP

(57) ABSTRACT

A heat transfer label assembly includes a heat transfer label including ink and adhesive, and a releasable support joined to the heat transfer label. The adhesive may include at least one of a polyketone resin and a polyamide resin. The heat transfer label may be used to decorate a metal article.

38 Claims, 1 Drawing Sheet

HEAT TRANSFER LABEL FOR DECORATING A METAL CONTAINER

CROSS-REFERENCE TO RELATED APPLICATION

This application claims the benefit of U.S. Provisional Application No. 61/394,843, filed Oct. 20, 2010, which is incorporated by reference herein in its entirety.

BACKGROUND

Metal containers, for example, cans, are typically formed from a sheet of metal that is printed (e.g., decorated or labeled with printed ink), stamped into a flat blank, and rolled into a cylinder (or other shape). Typically, a large number of pre-printed containers are made for each product or SKU (stock-keeping unit). When there is a demand for the product, the containers are filled and processed for distribution. Unfortunately, if there is an insufficient demand for the product, many pre-printed containers will remain in inventory indefinitely. Further, the process of forming and/or filling the container may cause damage to the printed label.

Thus, there is a need for a method of decorating (e.g., labeling) a metal container after the container is at least partially formed. There is further a need for a decorated (e.g., labeled) metal container formed using the method.

SUMMARY

In one aspect, this disclosure is directed to method of decorating (e.g., labeling) a metal container or other metal article. In one example, the method includes applying a heat transfer label to a metal container after the container is at least partially formed. In this manner, a plurality of containers can be at least partially formed and then decorated only when needed, thereby improving the efficiency of the manufacturing and decorating process and allowing late stage differentiation of products if needed.

In other aspects, this disclosure is directed to a heat transfer label assembly for decorating a metal container, the various components of the heat transfer label assembly, a heat transfer label formed from the assembly, and a container decorated with the heat transfer label. The heat transfer label provides suitable adhesion to a metal container and suitable scuff resistance to withstand further processing and/or handling of the container.

Other features, aspects, and embodiments will be apparent from the following description and accompanying figures.

BRIEF DESCRIPTION OF THE DRAWINGS

The description refers to the accompanying drawings in which like reference characters refer to like parts throughout the several views, and in which.

DESCRIPTION

Figure 1A:
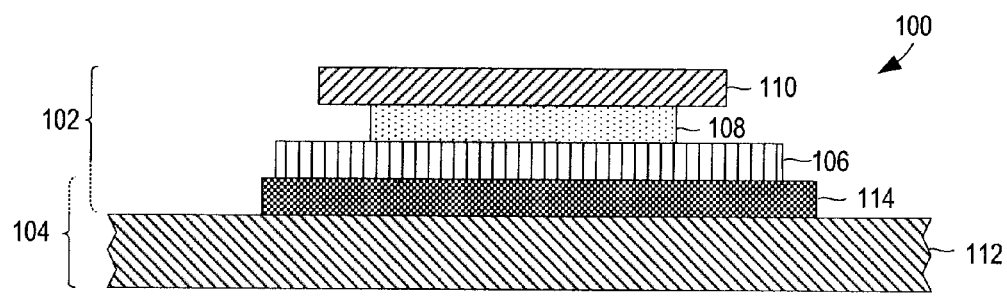
FIG. 1A is a schematic cross-sectional view of an exemplary heat transfer label assembly, including a heat transfer label.
Figure 1B:
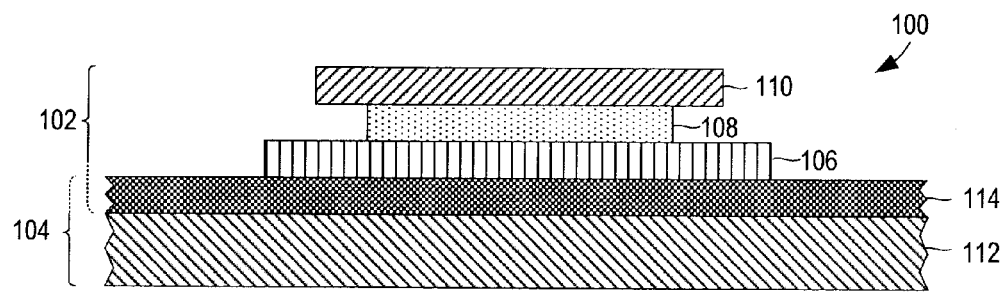
FIG. 1B is a schematic cross-sectional view of another exemplary heat transfer label assembly, including a heat transfer label.

FIGS. 1A and 1B schematically illustrate variations of an exemplary heat transfer label assembly 100, with the relative widths of the various layers generally indicating the relative area of each layer in the structure. It will be understood that the relative thicknesses of the various layers may be altered or exaggerated for purposes of illustration, and that such thicknesses are not indicative of actual or relative thicknesses of actual structures. It will also be understood that, while one specific structure or assembly 100 is illustrated schematically in FIGS. 1A and 1B, each heat transfer label assembly may vary for each application. Layers may be added or omitted as needed. Other modifications are contemplated.

In the exemplary embodiments shown in FIGS. 1A and 1B, the heat transfer label assembly 100 generally comprises a plurality of layers that define a heat transfer label portion 102 (or simply heat transfer label 102 or label 102) and a releasable support portion (or releasable carrier or release portion) 104. Each layer of the heat transfer label assembly 100 is in a substantially facing, contacting relationship with the respective adjacent layer(s). The layers may be partial or complete.

The heat transfer label 102 generally includes a protective coating or layer 106, one or more ink layers 108 (shown as a single ink layer 108) configured to define one or more graphics and/or text (collectively "decoration"), and an adhesive coating or layer 110. The releasable support portion 104 generally includes a carrier or substrate 112 and a release layer 114.

The carrier 112 generally comprises a base material on which the remaining layers of the heat transfer label assembly 100 are supported. However, although some layers or components of the heat transfer label assembly 100 are described as "overlying" or being "on" other layers or components, it will be appreciated that the heat transfer label assembly 100 may be inverted, such that different layers or components may be said to "overlie" or be "on" others. Accordingly, such terminology is provided merely for convenience of explanation and not limitation in any manner.

Figure 1C:
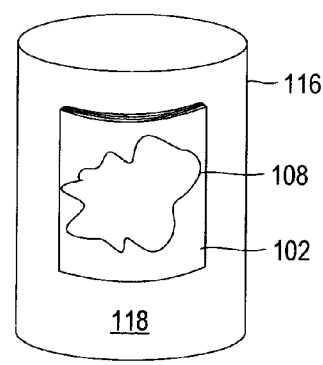
FIG. 1C is a schematic perspective view of a metal container decorated with the heat transfer label of FIG. 1A or FIG. 1B.

When the label 102 is joined to a container 116 (FIG. 1C), the adhesive 110 generally contacts (i.e., is directly adjacent to) the exterior surface 118 of the container 116. The protective coating 106 (and/or any residual release layer 114 material) defines an outermost layer for the label 102 on the container 116 that serves to protect the decoration/ink 108 from damage.

A plurality of labels 102 are typically indexed along the length of the carrier 112 so that a multitude of containers 116 can be decorated using an automated process. It will be noted that the FIGS. 1A and 1B illustrate only one of such labels 102.

To use the heat transfer label assembly 100 according to one exemplary method, the assembly 100 may be brought into contact with the surface 118 of the container 116 with the adhesive 110 facing the container 116. Heat and pressure may be applied to the assembly 100 using, for example, a heated platen. The release layer 114 softens and allows the protective coating 106, ink 108, and adhesive 110 to separate from the carrier 112, while the application of pressure transfers the protective coating 106, ink 108, and adhesive 110 to the container 116. Additionally, at least some of the release layer 114 may transfer to the container 116. Thus, the outermost layer of the transferred label 102 may comprise the protective coating 106 and/or some of the release layer 114. The carrier 112 may be discarded if desired. Alternatively, it is contemplated that the carrier 112 may be recycled or reused. In some cases, the decorated container may then be subjected to a flaming process to improve the clarity of the heat transfer label 102.

Any suitable container 116 may be used, and in one example, the container 116 is formed at least partially from metal. The metal container 116 may have a metal surface or may have a coated surface, for example, a polymer coated surface.

Notably, since the heat transfer label is applied to the container after the container is formed, using a heat transfer label provides significant benefits for labeling metal containers. As stated above, metal containers are typically pre-printed as blanks prior to formation of the container. When a conventional pre-printing process is used, it is typical to print an excess amount of container blanks to ensure there is a sufficient supply if needed. However, if the blanks in inventory are not needed (e.g., due to a product change, label change, or otherwise), this pre-printing process may result in a significant amount of waste. Further, pre-printing the containers forecloses any late stage differentiation of the product (e.g., being able to mark a product as "new" or "improved").

In sharp contrast, the use of a heat transfer label allows the container to be formed, and optionally filled, prior to labeling, which eliminates the need for excess pre-printed or pre-labeled inventory. As a result, the use of a heat transfer label for decorating a metal container results in a more efficient process with less waste. Further, the heat transfer labels can be modified as needed to provide late stage product differentiation of the product.

Each layer of the heat transfer label assembly 100 may comprise various materials, and such materials may be used in any suitable relative amounts. Further, each layer may vary in basis weight or coat weight, depending on the needs of the particular decorating application. Additionally, various compositions may be used to form such layers. Thus, although some exemplary materials and compositions are described herein, other suitable materials and compositions may be used. Additionally, other basis weights or coat weights for each layer area are contemplated.

The adhesive layer 110 may generally comprise any thermally activated adhesive that is capable of adhering the other components of the heat transfer label 102 to the surface 118 of the container 116 (FIG. 1C), for example, a metal container. More particularly, the adhesive 110 may generally comprise one or more polymers and/or polymer resins, and in one example, the adhesive 110 may comprise at least one of a polyamide resin and a polyketone resin. In another example, the adhesive 110 may comprise both a polyamide resin and a polyketone resin. In yet another example, the adhesive 110 may comprise at least one polyamide resin and at least one polyketone resin. The present inventors have determined that such adhesives 110 provide excellent adhesion to the metal container to prevent the label 102 from peeling away from the container 116 when the metal container is filled, closed, and/or otherwise processed or handled. When both polyamide and polyketone resins are included in the adhesive 110, the polyamide resin and polyketone resin may be present in any suitable relative amounts. In one example, the adhesive 110 may comprise from about 5 to about 35 wt % polyketone resin and about 65 to about 95 wt % polyamide resin. In another example, the adhesive 110 may comprise from about 10 to about 25 wt % polyketone resin and about 75 to about 90 wt % polyamide resin. In still another example, the adhesive 110 may comprise from about 15 to about 22 wt % polyketone resin and about 78 to about 85 wt % polyamide resin, for example, about 19 wt % polyketone resin and about 81 wt % polyamide resin. However, other total and relative amounts of polyamide and/or polyketone resin may be used. Where more than one polyketone resin and/or more than one polyamide resin are used, the above values may refer to the total polyketone or polyamide content. Other components also may be present.

Any suitable polyketone resin or combination of polyketone resins may be used in the adhesive 110. In some embodiments, the adhesive 110 may comprise a polyketone resin having a softening temperature of from about 90° C. to about 140° C., from about 100° C. to about 130° C., or from about 110° C. to about 120° C., for example, about 115° C. One example of a polyketone resin that may be suitable for use in the adhesive layer 110 is Flexotone 1717-H (softening temperature of about 115° C.), available from Hexion Specialty Chemicals. However, countless other polyketone resins having various softening temperatures may be used in the adhesive layer 110.

Likewise, any suitable polyamide resin or combination of polyamide resins may be used in the adhesive 110. In some embodiments, the adhesive layer 110 may comprise a polyamide resin having a softening temperature of from about 100° C. to about 150° C., from about 110° C. to about 140° C., or from about 120° C. to about 130° C., for example, about 123° C. One example of a polyamide resin that may be suitable is Unirez 2209 (softening temperature of about 123° C.), available from Ashland Chemical. In other embodiments, the polyamide resin may have a softening temperature of from about 160° C. to about 215° C., from about 170° C. to about 205° C., or from about 180° C. to about 200° C., for example, about 185° C. One example of a polyamide resin that may be suitable is Flex-Rez 1084AS (softening temperature of about 185° C.), available from Hexion Specialty Chemicals. However, other polyamide resins having various softening temperatures may be used.

In still other embodiments, a combination of polyamide resins may be used in the adhesive 110. Each polyamide resin may have different properties that, in combination, help to impart the desired degree of adhesion, hardness, blocking resistance, heat resistance, scratch resistance, rub resistance, and/or any other property or characteristic to the adhesive 110. In one such example, the adhesive 110 may comprise a first polyamide resin having a softening temperature of from about 100° C. to about 150° C. and a second polyamide resin having a softening temperature of from about 160° C. to about 215° C. In another example, the adhesive 110 may comprise a first polyamide resin having a softening temperature of from about 110° C. to about 140° C. and a second polyamide resin having a softening temperature of from about 170° C. to about 205° C. In yet another example, the adhesive 110 may comprise a first polyamide resin having a softening temperature of from about 120° C. to about 130° C. and a second polyamide resin having a softening temperature of from about 180° C. to about 200° C. And in one particular example, the adhesive 110 may comprise a first polyamide resin having a softening temperature of about 123° C. and a second polyamide resin and a softening temperature of about 185° C.

The first and second polyamide resins may be included in the adhesive 110 in any suitable relative amounts. For instance, in some exemplary embodiments, the ratio of the first polyamide resin to the second polyamide resin may be from about 3:1 to about 15:1, from about 4:1 to about 14:1, from about 5:1 to about 13:1, from about 6:1 to about 12:1, from about 7:1 to about 11:1, or from about 8:1 to about 10:1, for example, about 9:1, or about 9.3:1.

The adhesive layer 110 may have a basis weight (i.e., dry coat weight) of from about 0.5 to about 3 lb/ream, for example, from about 1 to about 1.5 lb/ream.

Returning to FIGS. 1A and 1B, the protective coating 106 may generally comprise any polymer or polymer resin, or any combination of polymers and/or polymer resins, that impart the desired characteristics to the label 102 needed for a particular labeling application. For example, when label 102 is to be applied before the container is filled and/or before the ends of the container are closed, the protective coating 106 may provide scuff resistance and/or flexibility to the label 102 so the label 102 remains intact and substantially undamaged when the container 116 is filled or otherwise processed.

In one particular example, the protective coating 106 may comprise one or more polyester resins, each of which may have different properties that provide the overall desired characteristics of the protective coating 106. Examples of polyester resins that may be suitable include Vitel® 2200B and Vitel® 3200 from Bostik Inc. However, countless other suitable polyester resins may be used.

The protective coating 106 may have a basis weight (i.e., dry coat weight) of from about 0.5 to about 1.5 lb/ream, for example, about 1 lb/ream.

Returning again to FIGS. 1A and 1B, the release layer 114 may generally comprise a material that facilitates the release of the heat transfer label from the carrier 112.

In one embodiment, the release layer 114 may comprise a wax, for example, up to 100% wax, which may be typically applied in an amount of about 6 lb/ream.

In another embodiment, the release layer 114 may comprise a polymer (or polymeric material) and a wax. Such a release layer 114 may have a basis weight or dry coat weight of from about 0.5 to about 5 lb/ream, for example, from about 1 to about 3 lb/ream, for example, about 2.5 lb/ream.

Any suitable polymer and/or wax may be used. For example, the polymer may comprise a polyolefin or an olefin copolymer, for example, an undecanoic acid copolymer (e.g., C-6112 polymer from Baker Hughes, Barnsdall, Okla.). The wax may comprise carnauba wax, and more particularly, may comprise micronized carnauba wax (e.g., MICROKLEAR 418 Micronized Carnauba Wax, Micro Powders, Inc., Tarrytown, N.Y.). Further, the polymer and wax may be included in the release layer 114 in any suitable relative amounts. For example, the polymer and wax may be present in a ratio of from about 3:1 to about 1:3 by weight, for example, from about 2.5:1 to about 1.5:1, for example, about 2:1.

If desired, the release layer 114 may also include a slip additive to modify the coefficient of friction of the transferred portion of the release layer 114 (i.e., overlying all or a portion of the protective coating 106). In one embodiment, the slip additive may comprise a siloxane. The present inventors have discovered that the presence of a siloxane in the release layer 114 may improve the lubricity, and therefore the scuff resistance, of the label 102. While countless possibilities are contemplated, one example of a siloxane that may be suitable for use as a slip additive Siltech C-32, available from Siltech Corporation. Other slip additives may be used.

The release layer 114 may include, for example, from about 0.25 to about 2 wt %, from about 0.5 to about 1.5 wt %, from about 0.75 to about 1.3 wt %, or from about 0.9 to about 1.2 wt %, for example, about 1.1 wt % of the slip additive. The release layer 114 may include other components, for example, optical brighteners, processing aids, printing aids, and so on.

The substrate or carrier 112 may generally comprise a flexible material, for example, paper. The paper may include a clay coating on one or both sides. The paper may have a basis weight of from about 5 to about 75 lb/ream (i.e., lb/3000 sq. ft.), for example, about 10 to about 50 lb/ream, for example, from about 20 to about 30 lb/ream. However, other ranges and basis weights are contemplated. In other instances, the carrier 112 may comprise other materials, for example, a polymer film. In one particular example, the carrier 112 may comprise a polyolefin film having a thickness of from about 1 to about 3 mil, for example, 2 mil. In another example, the carrier 112 may comprise a polyethylene terephthalate film. One example of a polyethylene terephthalate film that may be suitable is Polyester HS, 142 gauge S1S PET, commercially available from Griffin Paper and Films (Holliston, Mass.). However other suitable carriers may be used.

Any suitable process or method may be used to make a heat transfer label assembly 100 according to the disclosure. Further, different printing techniques (e.g., gravure, flexography, offset, lithography, (UV flexography, UV offset, UV lithography) may be used to form the various layers.

In one exemplary apparatus or process, the substrate or carrier 112 may be unwound from a roll.

A release layer composition may be deposited onto the carrier 112 and dried and/or cured as needed to form the release layer 114. The release layer composition may be applied to the carrier 112 so that the resulting release layer 114 has approximately the same shape/area as the label decoration (i.e., the ink 108), as shown schematically in FIG. 1A, or so that the resulting release layer 114 comprises a substantially continuous layer (i.e., a flood coat), as shown schematically in FIG. 1B.

In some embodiments (e.g., where the release layer 114 substantially comprises wax), the release layer composition generally comprises a molten wax.

In other embodiments (e.g., where the release layer 114 comprises polymer and a wax), the release layer composition may include, for example, from about 20 to about 25 wt % solids, for example, about 22 wt % solids (e.g., polymer plus wax). The release layer composition may also include a diluent, which also may serve as a drying agent. The release layer composition may also include other components, for example, solvents and/or other additives (e.g., optical brighteners, processing aids, printing aids, and so on).

Thus, although countless possibilities are contemplated, one exemplary release layer composition may comprise:
about 60 wt % solvent;
about 22 wt % solids; and
about 18 wt % diluent/drying agent.

Another exemplary release layer composition may comprise:
about 59.9 wt % solvent;
about 14.6 wt % polymer or polymeric material (e.g., C-6112);
about 7.4 wt % wax (e.g., MK-418 from Micro Powder);
about 18.0 wt % diluent/drying agent; and
about 0.1 wt % optical brightener.

Yet another exemplary release layer composition may comprise:
about 59.9 wt % toluene (solvent);
about 14.6 wt % olefin copolymer;
about 7.4 wt % micronized 100% carnauba wax;
about 18.0 wt % ethyl alcohol (drying agent); and
about 0.1 wt % D-298 columbia blue optical brightener.

If desired, the release layer composition may also include a slip additive in an amount of, for example, from about 0.05 to about 1 wt %, from about 0.1 to about 0.5 wt %, from about 0.15 to about 0.35 wt %, or from about 0.2 to about 0.3 wt %, for example, about 0.25 wt % of the release layer composition. However, other suitable amounts may be used.

Thus, one exemplary release layer composition may comprise:
about 60 wt % solvent;
about 22 wt % solids;
about 17.65 wt % diluent/drying agent; and
about 0.25 wt % slip additive.

Another exemplary release layer composition may comprise:
- about 59.9 wt % solvent;
- about 14.6 wt % polymer or polymeric material (e.g., C-6112);
- about 7.4 wt % wax (e.g., MK-418 from Micro Powder);
- about 17.65 wt % diluent/drying agent; and
- about 0.25 wt % slip additive.
- about 0.1 wt % optical brightener.

Still another exemplary release layer composition may comprise:
- about 59.9 wt % toluene (solvent);
- about 14.6 wt % olefin copolymer;
- about 7.4 wt % micronized 100% carnauba wax;
- about 17.65 wt % diluent/drying agent; and
- about 0.25 wt % slip additive.
- about 0.1 wt % D-298 columbia blue optical brightener.

While some exemplary release layer compositions are provided, it will be appreciated that countless other release layer compositions are contemplated by the disclosure. The relative amounts of each component may vary for each application. Additionally, other solvents, release layer solids, diluents/drying agents, and other components may be include in the release layer composition.

In another exemplary process, the carrier 112 may be provided with the release layer 114 pre-coated onto one side of the carrier 112, such that the release portion 104 is pre-formed.

A protective coating composition may then be applied to the release layer 114 and dried and/or cured as needed to form the protective coating 106. In some exemplary processes, the protective coating composition may have a relatively low solids content, for example, from about 20 to about 35 wt % solids or, for example, from about 25 to about 30 wt % solids.

Accordingly, although numerous possibilities are contemplated, one exemplary protective coating composition may comprise:
- about 69.9 wt % solvent;
- about 27.0 wt % polymer resin or polymeric material; and
- about 3.1 wt % other (non-resin) components.

Another exemplary protective coating composition may comprise:
- about 39.0 wt % methyl ethyl ketone (solvent);
- about 17.8 wt % toluene (solvent);
- about 13.1 wt % n-propyl acetate (solvent);
- about 27.0 wt % polymer resin or polymeric material; and
- about 3.1 wt % other (non-resin) components.

Yet another exemplary protective composition may comprise:
- about 69.9 wt % solvent;
- about 27.0 wt % polymer resin or polymeric material; and
- about 2.7 wt % crosslinking agent;
- about 0.3 wt % catalyst; and
- about 0.1 wt % optical brightener.

Still another exemplary protective composition may comprise:
- about 39.0 wt % methyl ethyl ketone (solvent);
- about 17.8 wt % toluene (solvent);
- about 13.1 wt % n-propyl acetate (solvent);
- about 27.0 wt % thermoplastic polymer resin or polymeric material;
- about 2.7 wt % crosslinking agent;
- about 0.3 wt % catalyst; and
- about 0.1 wt % optical brightener.

Yet another exemplary protective composition may comprise:
- about 69.9 wt % solvent;
- about 27.0 wt % thermoplastic, high molecular weight, aromatic, linear saturated polyester resin; and
- about 3.1 wt % other (non-resin) components.

Still another exemplary protective composition may comprise:
- about 39.0 wt % methyl ethyl ketone (solvent);
- about 17.8 wt % toluene (solvent);
- about 13.1 wt % n-propyl acetate (solvent);
- about 21.6 wt % polyester resin (e.g., Vitel® 2200B from Bostik Inc.);
- about 5.4 wt % polyester resin (e.g., Vitel® 3200 from Bostik Inc.);
- about 2.7 wt % crosslinking agent (e.g., Cymel® 303 from Cytec Industries, Inc.);
- about 0.3 wt % catalyst (e.g., Cycat® 4040 from Cytec Industries, Inc.); and
- about 0.1 wt % optical brightener (e.g., Unitex OB from Ciba Geigy Corp.).

As stated above, the present inventors have determined that the above exemplary protective coating compositions result in the formation of a protective coating 106 that provides excellent flexibility and resistance to scuffing, for example, when the metal container 116 is filled, closed, and/or otherwise processed or handled. However, countless other protective coatings 106 and protective coating compositions may be suitable.

Various ink compositions may then be printed (typically as a plurality of superposed layers that define the graphics and/or text) onto the protective coating 106 and dried and/or cured as needed to form the dried and/or cured ink 108. Any suitable ink may be used, for example, vinyl ink or nitrocellulose ink. If needed or desired (e.g., when the heat transfer label 102 is intended to be applied to a colored container), one or more layers of white ink may then be printed onto the ink 108.

An adhesive layer composition may then be applied over the ink 108 and cured and/or dried as needed to form the adhesive layer 110. As shown in FIG. 1A, the adhesive layer composition may be applied so that the adhesive 110 is in register with the ink 108 to be transferred to the container 116. The adhesive 110 may also extend beyond the peripheral margin of the ink 108 to ensure complete transfer of the ink 108 to the container 116.

In some exemplary processes, the adhesive layer composition may include, for example, from about 35 to about 50 wt % solids, for example, from about 40 to about 45 wt % solids. Thus, although countless possibilities are contemplated, one exemplary adhesive layer composition may comprise:
- about 55.8 wt % solvent;
- about 43.1 wt % polymer resin or polymeric material; and
- about 1.1 wt % other (non-resin) components.

Another adhesive layer composition may comprise:
- about 33.0 wt % ethyl alcohol (solvent);
- about 22.8 wt % lacolene (solvent);
- about 43.1 wt % polymer resin or polymeric material; and
- about 1.1 wt % other (non-resin) components.

Yet another exemplary adhesive layer composition may comprise:
- about 55.8 wt % solvent;
- about 43.1 wt % polymer resin or polymeric material;
- about 1.0 wt % water; and
- about 0.1 wt % optical brightener.

Still another exemplary adhesive layer composition may comprise:
- about 33.0 wt % ethyl alcohol (solvent);
- about 22.8 wt % lacolene (solvent);
- about 43.1 wt % polymer resin or polymeric material;
- about 1.0 wt % water; and
- about 0.1 wt % optical brightener.

Yet another exemplary adhesive layer composition may comprise:
- about 55.8 wt % solvent;
- about 43.1 wt % at least one of polyamide resin and polyketone resin; and
- about 1.1 wt % other (non-resin) components.

Still another exemplary adhesive layer composition may comprise:
- about 55.8 wt % solvent;
- about 8.0 wt % polyamide resin;
- about 35.1 wt % polyketone resin; and
- about 1.1 wt % other (non-resin) components.

Yet another exemplary adhesive layer composition may comprise:
- about 33.0 wt % ethyl alcohol (solvent);
- about 22.8 wt % lacolene (solvent);
- about 8.0 wt % polyamide resin;
- about 35.1 wt % polyketone resin;
- about 1.0 wt % water; and
- about 0.1 wt % optical brightener.

Still another exemplary adhesive layer composition may comprise:
- about 33.0 wt % ethyl alcohol (solvent);
- about 22.8 wt % lacolene (solvent);
- about 8.0 wt % polyketone resin (e.g., Flexotone 1717-H);
- about 31.7 wt % polyamide resin (e.g., Unirez 2209);
- about 3.4 wt % polyamide resin (e.g., Flex-Rez 1084AS);
- about 1.0 wt % water; and
- about 0.1 wt % optical brightener.

As stated above, the present inventors have determined that the above exemplary adhesive layer compositions result in the formation of an adhesive layer 110 that provides excellent adhesion to the metal container to prevent the label from peeling away from the container when the metal container is filled, closed, and/or otherwise processed or handled. However, it will be appreciated that countless other adhesive layers 110 and adhesive layer compositions may be suitable.

It will also be appreciated that although the heat transfer label 102 and/or heat transfer label assembly 100 described herein may be particularly advantageous for use with metal articles, the heat transfer label 102 and/or heat transfer label assembly 100 (or any of the individual layers used to form the heat transfer label 102 and/or heat transfer label assembly 100) may also be suitable for use with other types of articles, for example, those formed from polymers (e.g., HDPE, PET, Barex, etc.), glass, or any other material.

Although certain embodiments of this invention have been described with a certain degree of particularity, those skilled in the art could make numerous alterations without departing from the spirit or scope of this invention. Any directional references (e.g., upper, lower, upward, downward, left, right, leftward, rightward, top, bottom, above, below, vertical, horizontal, clockwise, and counterclockwise) are used only for identification purposes to aid the reader's understanding of various embodiments, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other.

It will be recognized by those skilled in the art, that various elements discussed with reference to the various embodiments may be interchanged to create entirely new embodiments coming within the scope of the present invention. It is intended that all matter contained in the above description or shown in the accompanying drawings shall be interpreted as illustrative only and not limiting. Changes in detail or structure may be made without departing from the spirit of the invention. The detailed description set forth herein is not intended nor is to be construed to limit the present invention or otherwise to exclude any such other embodiments, adaptations, variations, modifications, and equivalent arrangements of the present invention.

Accordingly, it will be readily understood by those persons skilled in the art that, in view of the above detailed description of the invention, the present invention is susceptible of broad utility and application. Many adaptations of the present invention other than those herein described, as well as many variations, modifications, and equivalent arrangements will be apparent from or reasonably suggested by the present invention and the above detailed description thereof, without departing from the substance or scope of the present invention.

While the present invention is described herein in detail in relation to specific examples or aspects, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is not intended nor is to be construed to limit the present invention or otherwise to exclude any such other embodiments, adaptations, variations, modifications, and equivalent arrangements of the present invention.

What is claimed is:

1. A heat transfer label assembly, comprising:
   a heat transfer label portion including ink and an adhesive, wherein the adhesive comprises a polyketone resin and a polyamide resin, wherein the polyketone resin has a softening temperature of from about 90° C. to about 140° C.; and
   a releasable support portion joined to the heat transfer label portion.

2. The heat transfer label assembly of claim 1, wherein the adhesive comprises from about 5 to about 35 wt % polyketone resin and about 65 to about 95 wt % polyamide resin.

3. The heat transfer label assembly of claim 1, wherein the polyamide resin has a softening temperature of from about 100° C. to about 150° C.

4. The heat transfer label assembly of claim 1, wherein the polyamide resin has a softening temperature of from about 160° C. to about 215° C.

5. The heat transfer label assembly of claim 1, wherein the polyamide resin comprises a first polyamide resin and a second polyamide resin.

6. The heat transfer label assembly of claim 5, wherein the first polyamide resin has a softening temperature of from about 100° C. to about 150° C. and the second polyamide resin has a softening temperature of from about 160° C. to about 215° C.

7. The heat transfer label assembly of claim 5, wherein the ratio of the first polyamide resin to the second polyamide resin is from about 3:1 to about 15:1.

8. The heat transfer label assembly of claim 1, wherein the releasable support portion comprises a release layer and a carrier.

9. The heat transfer label assembly of claim 8, wherein the release layer comprises wax, and optionally, at least one of a polymer and a slip additive.

10. The heat transfer label assembly of claim 9, wherein the slip additive comprises a siloxane.

11. The heat transfer label assembly of claim 1, wherein the heat transfer label portion is for being adhered to a metal article.

12. A heat transfer label assembly, comprising:
a heat transfer label portion including ink and an adhesive, wherein the adhesive comprises from about 5 to about 35 wt % polyketone resin and about 65 to about 95 wt % polyamide resin,
wherein
the polyketone resin has a softening temperature of from about 90° C. to about 140° C., and
the polyamide resin has a softening temperature of from about 100° C. to about 150° C.; and
a releasable support portion joined to the heat transfer label portion, wherein the releasable support portion comprises a release layer and a carrier, wherein the releasable support portion is configured so that the release layer is positioned between the heat transfer label portion and the carrier.

13. A heat transfer label assembly, comprising:
a heat transfer label portion including ink and an adhesive, wherein the adhesive comprises from about 5 to about 35 wt % polyketone resin and about 65 to about 95 wt % polyamide resin,
wherein
the polyketone resin has a softening temperature of from about 90° C. to about 140° C., and
the polyamide resin has a softening temperature of from about 160° C. to about 215° C.; and
a releasable support portion joined to the heat transfer label portion, wherein the releasable support portion comprises a release layer and a carrier, wherein the releasable support portion is configured so that the release layer is positioned between the heat transfer label portion and the carrier.

14. A heat transfer label assembly, comprising:
a heat transfer label portion including ink and an adhesive, wherein the comprises from about 5 to about 35 wt % polyketone resin and about 65 to about 95 wt % polyamide resin; and
a releasable support portion joined to the heat transfer label portion,
wherein the polyamide resin comprises a first polyamide resin and a second polyamide resin, wherein the first polyamide resin has a softening temperature of from about 100° C. to about 150° C., and the second polyamide resin has a softening temperature of from about 160° C. to about 215° C.

15. The heat transfer label assembly of claim 14, wherein the ratio of the first polyamide resin to the second polyamide resin is from about 3:1 to about 15:1.

16. A heat transfer label assembly, comprising:
a heat transfer label portion including ink and an adhesive, wherein the adhesive comprises a polyketone resin and a polyamide resin, wherein the polyamide resin has a softening temperature of from about 100° C. to about 150° C.; and
a releasable support portion joined to the heat transfer label portion.

17. The heat transfer label assembly of claim 16, wherein the adhesive comprises from about 5 to about 35 wt % polyketone resin and about 65 to about 95 wt % polyamide resin.

18. The heat transfer label assembly of claim 16, wherein the polyketone resin has a softening temperature of from about 90° C. to about 140° C.

19. The heat transfer label assembly of claim 16, wherein the polyamide resin comprises a first polyamide resin, and the adhesive comprises a second polyamide resin.

20. The heat transfer label assembly of claim 19, wherein the second polyamide resin has a softening temperature of from about 160° C. to about 215° C.

21. The heat transfer label assembly of claim 20, wherein the ratio of the first polyamide resin to the second polyamide resin is from about 3:1 to about 15:1.

22. The heat transfer label assembly of claim 16, wherein the releasable support portion comprises a release layer and a carrier, wherein the release layer comprises wax, and optionally, a slip additive.

23. The heat transfer label assembly of claim 22, wherein the slip additive comprises a siloxane.

24. A heat transfer label assembly, comprising:
a heat transfer label portion including ink and an adhesive, wherein the adhesive comprises a polyketone resin and a polyamide resin, wherein the polyamide resin has a softening temperature of from about 160° C. to about 215° C.; and
a releasable support portion joined to the heat transfer label portion.

25. The heat transfer label assembly of claim 24, wherein the adhesive comprises from about 5 to about 35 wt % polyketone resin and about 65 to about 95 wt % polyamide resin.

26. The heat transfer label assembly of claim 24, wherein the polyketone resin has a softening temperature of from about 90° C. to about 140° C.

27. The heat transfer label assembly of claim 24, wherein the polyamide resin comprises a first polyamide resin, and the adhesive comprises a second polyamide resin.

28. The heat transfer label assembly of claim 27, wherein the second polyamide resin has a softening temperature of from about 100° C. to about 150° C.

29. The heat transfer label assembly of claim 28, wherein the ratio of the first polyamide resin to the second polyamide resin is from about 3:1 to about 15:1.

30. The heat transfer label assembly of claim 24, wherein the releasable support portion comprises a wax, and optionally, a slip additive.

31. The heat transfer label assembly of claim 30, wherein the slip additive comprises a siloxane.

32. A heat transfer label assembly, comprising:
a heat transfer label portion including ink and an adhesive, wherein the adhesive comprises a polyketone resin, a first polyamide resin, and a second polyamide resin; and
a releasable support portion joined to the heat transfer label portion.

33. The heat transfer label assembly of claim 32, wherein the first polyamide resin has a softening temperature of from about 100° C. to about 150° C. and the second polyamide resin has a softening temperature of from about 160° C. to about 215° C.

34. The heat transfer label assembly of claim 32, wherein the ratio of the first polyamide resin to the second polyamide resin is from about 3:1 to about 15:1.

35. The heat transfer label assembly of claim 32, wherein the adhesive comprises from about 5 to about 35 wt % polyketone resin.

36. The heat transfer label assembly of claim 32, wherein the polyketone resin has a softening temperature of from about 90° C. to about 140° C.

37. The heat transfer label assembly of claim 32, wherein the releasable support portion comprises wax, and optionally, a slip additive.

38. The heat transfer label assembly of claim 37, wherein the slip additive comprises a siloxane.

* * * * *

UNITED STATES PATENT AND TRADEMARK OFFICE
CERTIFICATE OF CORRECTION

PATENT NO.         : 8,709,556 B2                                             Page 1 of 1
APPLICATION NO.    : 13/276413
DATED              : April 29, 2014
INVENTOR(S)        : Saifuddin M. Ansari et al.

It is certified that error appears in the above-identified patent and that said Letters Patent is hereby corrected as shown below:

In the Specification

Column 5,
Line 48, "slip additive Siltech C-32," should be --slip additive is Siltech C-32,--.

Column 6,
Line 9, "(UV flexography," should be --UV flexography,--.

Column 7,
Line 23, "may be include" should be --may be included--.

In the Claims

Column 11,
Line 39 (claim 14), "wherein the comprises" should be --wherein the adhesive comprises--.

Signed and Sealed this
Fifth Day of August, 2014

Michelle K. Lee
*Deputy Director of the United States Patent and Trademark Office*